US012764732B2

(12) United States Patent
Wang et al.

(10) Patent No.: US 12,764,732 B2
(45) Date of Patent: Oct. 13, 2026

(54) INFORMATION TRANSMISSION METHOD USING QUASI-CO-LOCATION REFERENCE SIGNALS

(71) Applicant: ZTE CORPORATION, Shenzhen (CN)

(72) Inventors: Yuxin Wang, Shenzhen (CN); Zhaohua Lu, Shenzhen (CN); Chuangxin Jiang, Shenzhen (CN); Shujuan Zhang, Shenzhen (CN); YuNgok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 688 days.

(21) Appl. No.: 17/607,658

(22) PCT Filed: Apr. 16, 2020

(86) PCT No.: PCT/CN2020/085099
§ 371 (c)(1),
(2) Date: Oct. 29, 2021

(87) PCT Pub. No.: WO2020/221016
PCT Pub. Date: Nov. 5, 2020

(65) Prior Publication Data

US 2022/0201714 A1 Jun. 23, 2022

(30) Foreign Application Priority Data

Apr. 30, 2019 (CN) ......................... 201910364189.5

(51) Int. Cl.
*H04W 72/1263* (2023.01)
*H04W 72/0446* (2023.01)
(Continued)

(52) U.S. Cl.
CPC ... *H04W 72/1263* (2013.01); *H04W 72/0446* (2013.01); *H04W 72/0453* (2013.01); *H04W 72/23* (2023.01)

(58) Field of Classification Search
CPC ......... H04W 72/1263; H04W 72/0446; H04W 72/0453; H04W 72/23; H04W 72/20;
(Continued)

(56) References Cited

U.S. PATENT DOCUMENTS

2020/0077432 A1* 3/2020 Xiong ............... H04L 27/26025
2020/0162144 A1* 5/2020 Zhou ...................... H04B 7/088
(Continued)

FOREIGN PATENT DOCUMENTS

CN 108111272 A 6/2018
CN 110536442 A 12/2019
(Continued)

OTHER PUBLICATIONS

U.S. Appl. No. 62/826,392, filed Mar. 29, 2019 (Year: 2019).*
(Continued)

*Primary Examiner* — Sun Jong Kim
(74) *Attorney, Agent, or Firm* — Li & Cai Intellectual Property (USA) Office

(57) ABSTRACT

The present application provides an information sending method, an information sending apparatus, an information receiving method and an information receiving apparatus. The information sending method includes determining a resource for sending information, and instructing, by means of signaling, a terminal to receive information on the resource, or predefining the resource on which the terminal receives information; and determining a scheme for sending information, and instructing the terminal, by means of signaling, about the scheme for sending information, or predefining the scheme for sending information.

12 Claims, 2 Drawing Sheets

(51) Int. Cl.
*H04W 72/0453* (2023.01)
*H04W 72/23* (2023.01)

(58) Field of Classification Search
CPC ..... H04B 7/024; H04L 5/0023; H04L 5/0048; H04L 5/0053; H04L 5/0094; H04L 5/0005
See application file for complete search history.

(56) References Cited

U.S. PATENT DOCUMENTS

| | | | | |
|---|---|---|---|---|
| 2020/0178315 | A1* | 6/2020 | Li | H04W 16/14 |
| 2022/0104237 | A1* | 3/2022 | Muruganathan | H04L 5/0051 |
| 2022/0131652 | A1* | 4/2022 | Bae | H04L 1/1642 |
| 2022/0167329 | A1* | 5/2022 | Laddu | H04L 1/0025 |

FOREIGN PATENT DOCUMENTS

| | | | | |
|---|---|---|---|---|
| EP | 3930388 | A1 | | 12/2021 |
| WO | WO 2018083551 | A1 | | 5/2018 |
| WO | WO-2020211095 | A1 | * | 10/2020 |

OTHER PUBLICATIONS

English Translation Copy of WO 2020/211095 (Year: 2019).*
U.S. Appl. No. 62/768,724, filed Nov. 16, 2018 (Year: 2018).*
WIPO, International Search Report issued on Jun. 29, 2020.
ZTE. "Considerations on beam management for multi-TRP," 3GPP TSG RAN WG1#96 bis, Xi'an China, Mar. 30, 2019.
European Patent Office, Extended European Search Report, dated Nov. 28, 2022, for corresponding EP application No. 20798985.6.
ZTE, "Enhancements on Multi-TRP and Multi-patent Transmission", 3GPP Draft, Apr. 7, 2019.
"3rd Generation Partnership Project, Technical Specification Group Radio Access Network; NR, Physical Channels and Modulation", 3GPP Standard, Mar. 27, 2019.

* cited by examiner

INFORMATION TRANSMISSION METHOD USING QUASI-CO-LOCATION REFERENCE SIGNALS

CROSS-REFERENCE TO RELATED APPLICATION

The present application claims priority from the Chinese patent application No. 201910364189.5 filed with the China Patent Office on Apr. 30, 2019, the entire contents of which are incorporated in the present application by reference.

TECHNICAL FIELD

The present application relates to the field of wireless communication networks, and for example, relates to an information sending method, an information sending apparatus, an information receiving method and an information receiving apparatus.

BACKGROUND

In Release-15 of new radio (NR), joint transmission with a same terminal by multiple communication nodes is not sufficiently discussed. Therefore, in a scenario where multiple communication nodes perform joint transmission with one terminal, how to increase the transmission efficiency is a problem to be solved.

SUMMARY

The present application provides an information sending method, an information sending apparatus, an information receiving method and an information receiving apparatus which can increase the transmission efficiency in the scenario where a plurality of communication nodes perform joint transmission with one terminal.

An embodiment of the present application provides an information sending method, including: determining a resource required for sending information, and instructing, by means of signaling, a terminal to receive information on the resource, or predefining the resource on which the terminal receives information; and determining a scheme required for sending information, and instructing the terminal, by means of signaling, about the scheme for sending information, or predefining the scheme for sending information.

An embodiment of the present application provides an information receiving method, including: determining a resource required for receiving information, and receiving the information on the resource, the resource being a resource instructed by a signaling from a first communication node and/or a second communication node, or being a predefined resource; and determining a scheme required for receiving information, and receiving information according to the scheme, the scheme being a scheme instructed by a signaling from the first communication node and/or the second communication node, or being a predefined scheme.

An embodiment of the present application provides an information sending apparatus, including at least one processor configured to: determine a resource required for sending information, and instruct, by means of signaling, a terminal to receive information on the resource, or predefine the resource on which the terminal receives information; and determine a scheme required for sending information, and instruct the terminal, by means of signaling, about the scheme for sending information, or predefine the scheme for sending information.

An embodiment of the present application provides an information receiving apparatus, including at least one processor configured to: determine a resource required for receiving information, and receive the information on the resource; and determine a scheme required for receiving information, and receive information according to the scheme, where the resource is a resource instructed by a signaling from a first communication node and/or a second communication node, or a predefined resource.

An embodiment of the present application provides a first communication node, including: one or more processors; a storage device for storing one or more programs which, when executed by the one or more processors, cause the one or more processors to implement the information sending method as described in the embodiment of the present application.

An embodiment of the present application provides a terminal, including: one or more processors; and a storage device for storing one or more programs which, when executed by the one or more processors, cause the one or more processors to implement the information receiving method as described in the embodiment of the present application.

An embodiment of the present application provides a storage medium having a computer program stored thereon, the computer program, when executed by a processor, causes the information sending method according to the embodiment of the present application or the information receiving method according to the embodiment of the present application to be implemented.

DETAILED DESCRIPTION

Embodiments of the present application will be described in detail below with reference to the accompanying drawings.

Figure 1:
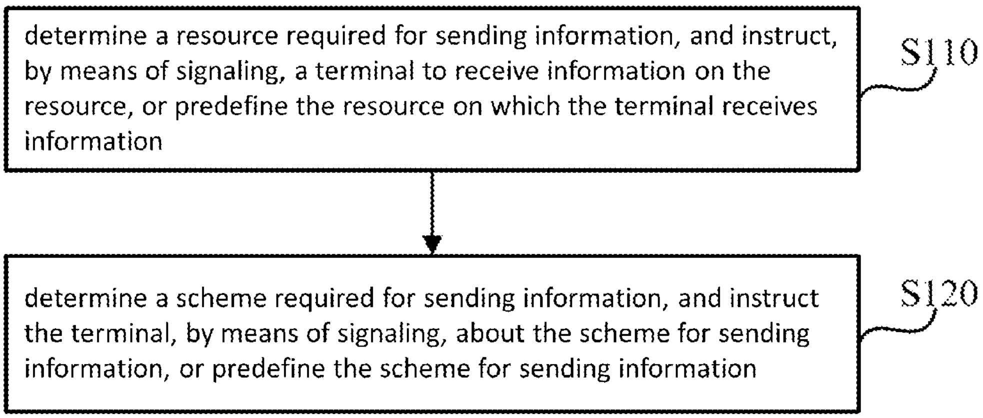
FIG. 1 is a schematic flowchart of an information sending method according to the present application.

In an exemplary implementation, FIG. 1 is a schematic flowchart of an information sending method according to the present application. The method may be suitable for the situation of increasing the transmission efficiency in the scenario where a plurality of communication nodes perform joint transmission with one terminal. The method may be implemented by an information sending apparatus, which may be implemented by software and/or hardware and integrated in a first communication node, provided in the present application.

In an implementation, the first communication node and a second communication node in the present application may be nodes such as base stations in a macro cell, base stations or transmission nodes in a small cell, transmission receive points (TRPs), sending nodes in a high frequency communication system, sending nodes in an Internet of Things system, or satellites in satellite communication, while a terminal may be a third communication node, which may be a node, relay node or small base station and the like in a communication system such as a user equipment (UE), a mobile phone, a portable device, or an automobile.

The information may be Physical Downlink Shared Channel (PDSCH) or Physical Uplink Shared Channel (PUSCH) information, or Physical Downlink Control Channel (PDCCH) or Physical Uplink Control Channel (PUCCH) information, or downlink/uplink demodulation reference signals, or uplink signals for random access, or Channel Sounding Reference Signals (SRSs), or phase tracking reference signals, or the like.

Ultra-Reliable and Low Latency Communication (uRLLC) transmission solutions under multiple TRPs can be divided into Space Division Multiplexing (SDM), i.e., a space division scheme, Frequency-division multiplexing (FDM), i.e., a frequency division scheme, and Time Division Multiplex (TDM), i.e., a time division scheme.

The FDM scheme can be further divided into a scheme 2*a* and a scheme 2*b*, which mainly differ from each other in that: in the scheme 2*a*, a transmission block outputs 1 codeword stream after being coded, while in the scheme 2*b*, a transmission block outputs 2 codeword streams after being coded.

Assuming that resource blocks (RBs) RB0 to RBN of frequency domain resources are occupied by a target user, then a resource assignment scheme among a plurality of TRPs in FDM may be a continuous resource assignment scheme in which TRP1 occupies RB0 to RBfloor (N/2), while TRP2 occupies RBfloor (N/2)+1 to RBN; or may be a discrete resource assignment scheme in which TRP1 occupies RB0, RB2, RB4, . . . and RBN-1, while TRP2 occupies RB1, RB3, RB5, . . . and RBN.

The frequency domain resource assignment of FDM may be in a granularity of a precoding resource block group (PRG) other than RB.

For the TDM solution, the time division may be performed within a timeslot, that is, different TRPs occupy different symbols within the timeslot, or may be performed among timeslots, that is, different TRPs occupy different timeslots.

As shown in FIG. 1, the present application provides an information sending method that includes S110 to S120.

At S110, determining a resource required for sending information, and instructing, by means of signaling, a terminal to receive information on the resource, or predefining the resource on which the terminal receives information.

In a case where a plurality of communication nodes perform joint transmission with the terminal, one of the communication nodes is determined as a first communication node via which the information required for receiving information is instructed to a user. The information required for receiving information includes at least one of a resource and a scheme, which are required.

In an implementation, the first communication node instructs the information required for sending information to the user.

In an implementation, the first communication node and the terminal may predefine the resource and/or the scheme for the terminal receiving information. The terminal and the first communication node perform information transmission based on the predefined resource.

In an implementation, the first communication node and the terminal predefine the information required for sending information.

In an implementation, the resource required for sending information is the resource required for the first communication node sending information to the terminal. In an implementation, the resource required for sending information is the resource required for the terminal sending information to the first communication node, and the first communication node instructs the terminal to send information on the determined resource via signaling.

The signaling is not limited, but in an implementation, the signaling is multiplexed on the basis of a related signaling. In an implementation, a new signaling is used as the signaling for instructing the terminal.

The resource may include at least one of: a frequency domain resource, a space domain resource, and a time domain resource.

In an implementation, the first communication node determining the resource required for sending information is to determine to use one of: a frequency domain resource, a space domain resource, and a time domain resource.

In an implementation, the first communication node determining the resource required for sending information includes at least one of: determining that the first communication node uses a frequency domain location in a first time domain resource and/or that the second communication node uses a frequency domain location in the first time domain resource; determining that the first communication node uses a slot location in the first time domain resource and/or that the second communication node uses a slot location in the first time domain resource; and determining that the first communication node uses a space location in the first time domain resource and/or that the second communication node uses a space location in the first time domain resource.

The method for the first communication node determining the required resource is not limited, as long as it is ensured that the terminal effectively performs data transmission with each communication node.

At S120, determining a scheme required for sending information, and instructing a terminal, by means of signaling, about the scheme for sending information, or predefining the scheme for sending information.

In an implementation, the first communication node instructs the terminal via signaling about at least one of: a scheme for sending information and a scheme for receiving information.

In an implementation, the first communication node and the terminal may predefine the scheme for the terminal receiving information and/or the terminal receiving information. The terminal and the first communication node perform information transmission based on the predefined scheme.

The signaling is not limited, and the signaling instructing the scheme for sending information and the signaling instructing the resource for receiving information may be the same or different. The signaling instructing the resource for receiving information is a first signaling, and the signaling instructing the scheme for sending information is a second signaling. In an implementation, the signaling is multiplexed on the basis of a related signaling. In an implementation, a new signaling is used as the signaling for instructing the terminal.

The first communication node determines a scheme for data transmission between the first/second communication node and the terminal. The scheme includes at least one of:

a space division scheme, a frequency division scheme, an intra-slot time division scheme, and an inter-slot time division scheme.

It should be noted that the execution sequence of S110 and S120 is not limited, and in an implementation, S110 is performed before S120. In an implementation, S120 is performed before S110. In an implementation, only S110 is performed. In an implementation, only S120 is performed.

In an implementation, the information sending method includes: determining a resource or scheme required for sending information; instructing, by means of signaling, a terminal to receive information on the resource, or instructing the terminal, by means of signaling, about the scheme for sending information, or predefining the resource on which the terminal receives information, or predefining the scheme for sending information.

The information sending method provided in the present application includes: determining the resource required for sending information, and instructing, by means of signaling, the terminal to receive information on the resource, or predefining the resource on which the terminal receives information; and determining the scheme required for sending information, and instructing the terminal, by means of signaling, about the scheme for sending information, or predefining the scheme for sending information. In the case where a plurality of communication nodes perform joint transmission with the terminal, the resource for receiving information or the scheme for sending information by the terminal is defined, and the transmission efficiency in the scenario where a plurality of communication nodes perform joint transmission with one terminal is increased.

On the basis of the above embodiment, variants of the above embodiment are provided. It should be noted here that only the differences from the above embodiment are described in the variants for the sake of brevity.

In an implementation, the resource includes at least one of: a frequency domain resource and a time domain resource.

Exemplarily, for a uRLLC transmission solution, in order to distinguish between SDM and FDM, a rule may be predefined between the TRP and the UE, and if the number of transmission configuration indications (TCIs) corresponding to a TCI state indicated by a TCI field in Downlink Control Information (DCI) is greater than 1, or the number of quasi co-location reference signal (QCL RS) sets included in the TCIs corresponding to the TCI state is greater than 1, it indicates that a plurality of TRPs perform transmission with one UE. Then, the transmission solution is judged according to the following conditions: (1) if DCI indicates a discrete resource assignment scheme, for example, indicates that the UE occupies RB0, RB2, RB4, . . . , RBN-1, then the UE may deduce that the transmission solution is FDM, and the frequency domain resources occupied by another TRP are RB1, RB3, RB5, . . . , RBN; and (2) if DCI indicates that the resources occupied by the UE are assigned in another manner, the UE may deduce that the transmission solution is SDM.

In an implementation, an assignment scheme of the frequency domain resources includes at least one of: continuous frequency domain resource assignment and discrete frequency domain resource assignment.

In an implementation, the scheme for sending information includes at least one of: a space division scheme, a frequency division scheme, an intra-slot time division scheme, and an inter-slot time division scheme.

In an implementation, the determining the resource required for sending information includes at least one of:

determining, when the scheme for sending information is a frequency division scheme and the number of TCIs corresponding to a TCI state indicated by a TCI field in downlink control information is greater than 1, that the resource is a frequency domain resource and includes at least one of a first frequency domain resource and a second frequency domain resource;

determining, when the scheme for sending information is a frequency division scheme and the number of QCL RS sets corresponding to a TCI state indicated by a TCI field in downlink control information is greater than 1, that the resource is a frequency domain resource and includes at least one of a first frequency domain resource and a second frequency domain resource;

determining, when the scheme for sending information is a time division scheme and the number of TCIs corresponding to a TCI state indicated by a TCI field in downlink control information is greater than 1, that the resource is a frequency domain resource and includes at least one of a first frequency domain resource and a second frequency domain resource; and determining, when the scheme for sending information is a time division scheme and the number of QCL RS sets corresponding to a TCI state indicated by a TCI field in downlink control information is greater than 1, that the resource is a frequency domain resource and includes at least one of a first frequency domain resource and a second frequency domain resource.

When the number of TCIs corresponding to the TCI state indicated by the TCI field in the downlink control information is greater than 1, or the number of QCL RS sets included in the TCIs corresponding to the TCI state is greater than 1, more than one communication nodes are in communication with the terminal.

The number of communication nodes performing data transmission with the terminal is determined according to the number of TCIs corresponding to the TCI state or the number of QCL RS sets included in the TCIs corresponding to the TCI state.

In an implementation, the number of communication nodes performing data transmission with the terminal is equal to the number of TCIs corresponding to the TCI state or the number of QCL RS sets included in the TCIs corresponding to the TCI state.

The first frequency domain resource and the second frequency domain resource may be frequency domain resources for data transmission between different communication nodes and the terminal. In an implementation, the first frequency domain resource is a frequency domain resource for data transmission between the first communication node and the terminal, and the second frequency domain resource is a frequency domain resource for data transmission between the second communication node and the terminal. At least one second frequency domain resource is provided. Different second frequency domain resources may correspond to different second communication nodes.

In an implementation, the information sending method further includes: determining an assigned location of the second frequency domain resource according to a difference value or sum value of an assigned location of the first frequency domain resource and a location offset value.

When two communication nodes perform data transmission with the terminal, the first frequency domain resource and the second frequency domain resource satisfy a relation that: the assigned location of the second frequency domain resource is equal to the assigned location of the first frequency domain resource plus the location offset value, or the assigned location of the first frequency domain resource minus the location offset value.

When at least two communication nodes perform data transmission with the terminal, at least one second frequency domain resource may be provided. The assigned location of each second frequency domain resource is equal to the assigned location of the first frequency domain resource plus the location offset value of the corresponding second communication node, or the assigned location of the first frequency domain resource minus the location offset value of the corresponding second communication node. Each second communication node has a corresponding offset value to ensure that frequency domain locations of each second frequency domain resource and the first frequency domain resource are not overlapped.

In an implementation, the first frequency domain resource and the second frequency domain resource are determined by at least one of: the downlink control information and being predefined.

In an implementation, when determining the resource required for sending information, the first communication node determines the first frequency domain resource and the second frequency domain resource required for sending information through the downlink control information, and determines the first frequency domain resource and the second frequency domain resource required for sending information by predefining.

Figure 2:
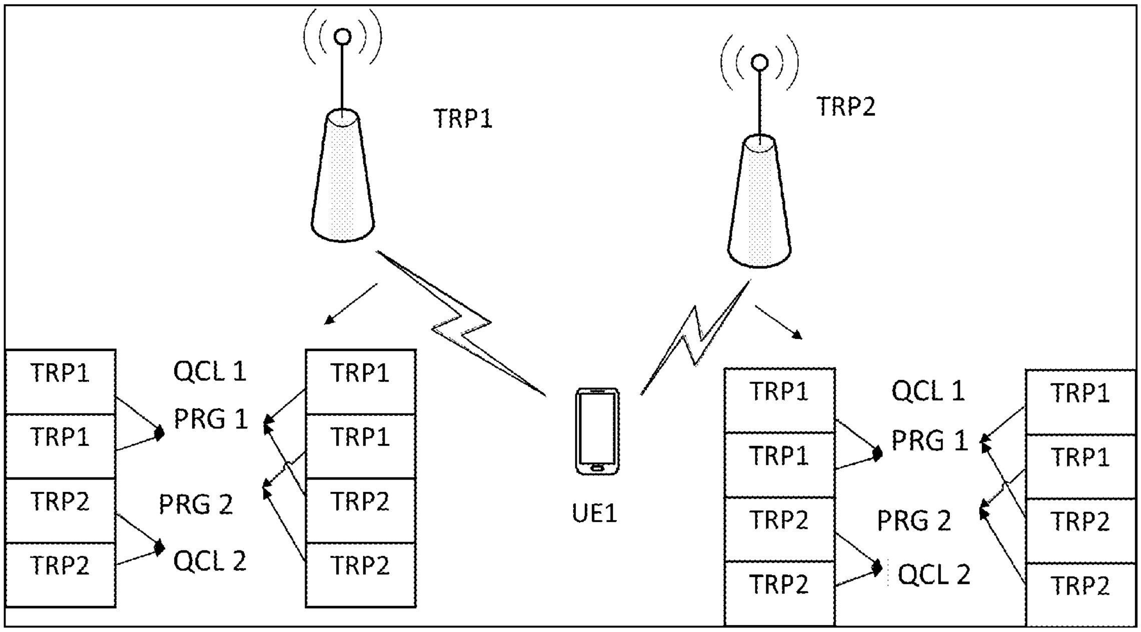
FIG. 2 is a schematic diagram showing discrete resource assignment and continuous resource assignment in an FDM transmission solution according to the present application.

Exemplarily, FIG. 2 is a schematic diagram showing discrete resource assignment and continuous resource assignment in an FDM transmission solution according to the present application. The resource assignment schemes for schemes 2*a* and 2*b* of the FDM transmission solution are as shown in FIG. 2, where the first communication node TRP1 and the second communication node TRP2 perform joint transmission with the terminal UE1, and a discrete or continuous resource assignment scheme is adopted during transmission.

Exemplarily, for the FDM transmission solution in uRLLC, assuming that a serving cell of UE1 is TRP1, and there is an ideal backhaul connection between TRP2 and TRP1. TRP1 schedules UE1 via downlink control information, and instructs a frequency domain location A at which UE1 receives downlink data from TRP1 in slot n. Then, the first communication node may predefine a frequency domain location B at which UE1 receives downlink data from TRP2 at the slot n, where B=A+frequency domain offset value, or B=A−frequency domain offset value, and A and B do not overlap in the frequency domain.

Alternatively, TRP1 schedules UE1 via a downlink control signaling and instructs a frequency domain location A at which UE1 sends uplink data to TRP1 in slot n. Then, the first communication node may predefine a frequency domain location B at which UE1 sends uplink data to TRP2 in the slot n, where B=A+frequency domain offset value, or B=A−frequency domain offset value, and A and B do not overlap in the frequency domain.

When a plurality of second communication nodes are provided, the frequency domain location of each second communication node is determined according to the frequency domain location of the first communication node and a frequency domain offset value corresponding to said each second communication node.

In an implementation, a frequency domain location corresponding to the first communication node at a first slot in the downlink control information is read; the frequency domain location of the second communication node is determined according to the frequency domain location of the first communication node, at least one second communication node is provided, and the frequency domain locations are not overlapped with each other; and the frequency domain locations of the first communication node and each second communication node are continuously changed in a next slot or a slot in a slot set of a current slot. The frequency domain locations of the first communication node and the second communication node are used to receive or transmit information.

In an implementation, the first frequency domain resource and the second frequency domain resource are determined by: exchanging, under a condition that the frequency domain resource for the first communication node sending the information is the first frequency domain resource and the frequency domain resource for the second communication node sending the information is the second frequency domain resource in a current slot or a slot in a slot set of the current slot, the frequency domain resources of the first communication node and the second communication node in a next slot or a next slot in the slot set of the current slot.

In an implementation, the slot set is a group formed by dividing time slots. Different time slots are divided into different groups to form different slot sets, such as a first slot set and a second slot set. When the current slot falls in the first slot set, the first slot set is a current slot set.

In the current slot or under the condition that the current slot is a slot in a slot set, the frequency domain resources of the first communication node and the second communication node are the first frequency domain resource and the second frequency domain resource, respectively. In the next slot or under the condition that the current slot is the next slot in the slot set, the frequency domain resources of the first communication node and the second communication node are exchanged so that the frequency domain resources of the first communication node and the second communication node are different from the frequency domain resources of the previous slot.

For example, there are two resource assignment schemes for schemes 2*a*/2*b*, i.e., a continuous resource assignment scheme and a discrete resource assignment scheme, respectively. The following is discussed in two cases.

(1) One resource assignment scheme is fixedly adopted.

Assuming that the serving cell of UE1 is TRP1, there is an ideal backhaul connection between TRP2 and TRP1. TRP1 schedules UE1 via downlink control information, instructs a frequency domain location A at which UE1 receives downlink data from TRP1 in slot n, and instructs a frequency domain location B at which UE1 receives downlink data from TRP2 in the slot n, or predefines a frequency domain location B at which UE1 receives downlink data from TRP2 in the slot n, where the frequency domain location A and the frequency domain location B do not overlap in the frequency domain. It can be predefined then that at the next slot n+1, UE1 receives the downlink data from TRP1 at the frequency domain location B, and receives the downlink data from TRP2 at the frequency domain location A. That is, the frequency domain locations at which UE1 receives information from TRP1 and TRP2 are alternately changed with changes of the slot in the time domain.

When at least two communication nodes are in communication with the terminal, the first communication node may exchange the frequency domain locations corresponding to the respective communication nodes so that the frequency domain locations corresponding to the communication nodes in the current slot are different from those of the previous slot.

Exemplarily, the continuous resource assignment scheme is fixedly adopted, and in order to increase the robustness of transmission, the assigned locations of the resources may be alternately changed with time. For example, in the slot n, the frequency domain location of TRP1 on Layer0 is the frequency domain resource of an upper half bandwidth; the frequency domain location of TRP2 on Layer1 is the frequency domain resource of a lower half bandwidth; in the slot n+1, the frequency domain location of TRP1 on Layer0 is the frequency domain resource of the lower half bandwidth; and the frequency domain location of TRP2 on Layer1 is the frequency domain resource of the upper half bandwidth.

(2) Two resource assignment schemes are adopted.

Assuming that a standard adopts both the continuous resource assignment scheme and the discrete resource assignment scheme, such two schemes may be switched by Radio Resource Control (RRC) configuration, or by DCI dynamic switching (associated with a certain dynamic parameter), or by changing with time. For example, in slot n, the continuous resource assignment scheme is adopted; and in slot n+1, the discrete resource assignment scheme is adopted.

The granularity for changes of the resource assignment schemes in the time domain may be divided according to odd/even slots, or according to slot sets. When two communication nodes are in communication with the terminal, in the next slot or under the condition that the current slot is the next slot in the slot set, the frequency domain resource for the first communication node sending the information is the second frequency domain resource, and the frequency domain resource for the second communication node sending the information is the first frequency domain resource.

In an implementation, the determining the scheme required for sending information includes: determining, under the condition that the assigned location of the frequency domain resource instructed by the signaling satisfies a preset rule, that the scheme for sending information is a frequency division scheme.

The preset rule may be determined according to RBs, RBGs (resource block groups), or PRGs.

In an implementation, the preset rule includes at least one of: the numbered assigned location of the frequency domain resource is an odd RB, an odd RBG, an odd PRG, an even RB, an even RBG or an even PRG.

In an implementation, the information sending method further includes: scrambling the sent information using a scrambling sequence generated by a scrambling sequence generator with initialization values determined by a determining scheme including at least one of: $c_{init}=n_{RNTI}-2^{15}+q\cdot 2^{x}+n_{ID}$, where x is 10, 11, 12 or 13; $g\in\{0,1\}$ and is associated with a CORESET (control resource set) group ID; $q\in\{0,1\}$ and is associated with the number of the transmitted codewords; $n_{RNTI}$ is a radio network temporary identity; and $n_{ID}\in\{0, 1, \ldots, 1023\}$ or is a cell ID.

To randomize interference with different TRPs, different initialization values may be used for different TRPs. When at least two communication nodes are in communication with the terminal, $g\in\{0, 1 \ldots n\}$ and is associated with the CORESET group ID; $q\in\{0, 1 \ldots m\}$ and is associated with the CORESET group ID. The value of n is associated with the CORESET group ID, and the value of m is associated with the CORESET group ID. In an implementation, n and m are integers.

In an implementation, the information sending method further includes: scrambling the sent information using a scrambling sequence generated by a scrambling sequence generator with initialization values determined by a determining scheme including at least one of: $c_{init}=n_{RNTI}\cdot 2^{15}+q\cdot 2^{14}+n_{ID}$, where $n_{ID}\in\{0, 1, \ldots, 1023\}$ or is a cell ID; where the value of q is associated with the CORESET group ID under the condition that at least two CORESET groups are configured in a higher-layer signaling.

In an implementation, the higher-layer signaling may be a signaling sent from the first communication node to the terminal.

Exemplarily, if RRC is configured with two CORESET groups, q is associated with the CORESET group ID, i.e., q takes a value of 0 or 1.

In a case where there are x CORESET group IDs, q may take a value ranging from 1 to x, where x is a positive number.

In an implementation, the value of q includes at least one of the following conditions: under the condition that the CORESET group ID is 0, the value of q corresponding to codeword 0 is 0, and the value of q corresponding to codeword 1 is 1; under the condition that the CORESET group ID is 0, the value of q corresponding to codeword 0 is 1, and the value of q corresponding to codeword 1 is 0; under the condition that the CORESET group ID is 1, the value of q corresponding to codeword 0 is 1, and the value of q corresponding to codeword 1 is 0; and under the condition that the CORESET group ID is 1, the value of q corresponding to codeword 0 is 0, and the value of q corresponding to codeword 1 is 1.

Under the condition that the CORESET group ID is y, the value of q corresponding to codeword 0 is 0, the value of q corresponding to codeword 1 is 1, the value of q corresponding to codeword 2 is 2, . . . , the value of q corresponding to codeword y is y. Alternatively, the value of q corresponding to each of codeword 0 to codeword y takes any value between 0 to y, and each q takes a different value, where y is a positive number.

In an implementation, the scheme for determining $n_{ID}$ includes at least one of: configuring at least two $n_{ID}$, which respectively correspond to at least two CORESET group IDs, to the terminal through a higher-layer signaling.

When at least two communication nodes are in communication with the terminal, the first communication node configures at least two $n_{ID}$, which take values respectively correspond to at least two CORESET group IDs, to the terminal through a higher-layer signaling.

In the case where the CORESET group IDs are between 0 and z, $n_{ID}$ takes a value ranging from 1 to z, where z is a positive number. Different CORESET group IDs correspond to different values of $n_{ID}$.

When two communication nodes are in communication with the terminal, two $n_{ID}$, corresponding to two CORESET group IDs respectively, are configured.

Under the condition that the CORESET group ID is 1, $n_{ID}$ is 1 or 0; and under the condition that the CORESET group ID is 0, $n_{ID}$ is 1 or 0.

In an implementation, under the condition that the scheme for sending information is a time division scheme, the time domain resource includes a first time domain resource and a second time domain resource.

The first time domain resource and the second time domain resource may be time domain resources for data transmission between different communication nodes and the terminal.

In an implementation, the first time domain resource is a time domain resource for data transmission between the first communication node and the terminal, and the second time domain resource is a time domain resource for data transmission between the second communication node and the terminal. At least one second time domain resource is provided. Different second time domain resources may correspond to different second communication nodes.

In an implementation, the information sending method further includes: determining a time domain symbol location of the second time domain resource according to a start symbol and a symbol length of the first time domain resource. Under the condition that at least two second communication nodes are provided, the time domain symbol location corresponding to each second communication node may be determined according to the start symbol and the symbol length of the first time domain resource.

In an implementation, second time domain resources are sequentially selected for the second transmission nodes after the time domain symbol location corresponding to the first time domain symbol. The time domain locations of the second time domain resources are not overlapped.

In an implementation, under the condition that the transmission solution is a time division scheme, a residual symbol length is determined according to a time domain resource assignment field in the downlink control information, the time domain resource assignment field indicating a symbol length and a start symbol location; and under the condition that the residual symbol length is greater than or equal to the symbol length, a time domain symbol location of at least one second communication node is determined according to the time domain resource assignment field.

In an implementation, the determining the residual symbol length according to the time domain resource assignment field in the downlink control information includes: subtracting the start symbol location and the symbol length from the number of symbols included in the slot to obtain the residual symbol length.

In an implementation, the determining the time domain symbol location of at least one second communication node according to the time domain resource assignment field includes: taking a symbol location obtained by the start symbol location plus the symbol length as an end symbol location; acquiring a target slot indicated by the downlink control information; and selecting a corresponding time domain symbol location for at least one second communication node after the end symbol location of the target slot, time domain symbol locations corresponding to the second communication nodes are not overlapped, and each time domain symbol location corresponds to a symbol length equal to the symbol length as described above.

Exemplarily, for the TDM transmission solution in uRLLC, assuming that the serving cell of UE1 is TRP1, and there is an ideal backhaul connection between TRP2 and TRP1. TRP1 schedules UE1 via downlink control information, and instructs that UE1 receives downlink data from TRP1 in slot n. If the time domain resource assignment field in DCI indicates a symbol length M, and a start symbol K, it means that UE1 receives the downlink data from TRP1 at a time domain symbol location from symbol K to symbol K+M−1. When (14−K−M) is greater than or equal to M (i.e., 2M<=14−K), UE1 receives downlink data from TRP2 at M symbols from symbol location K+M to 13 in slot n.

Figure 3:
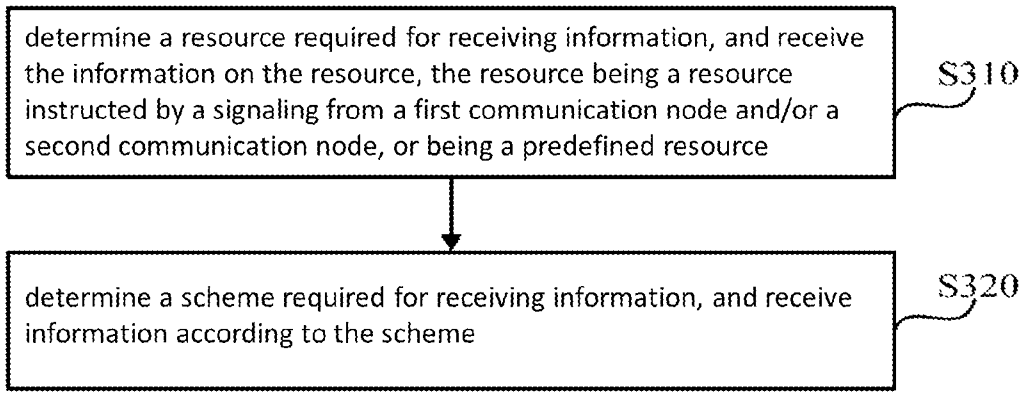
FIG. 3 is a schematic flowchart of an information receiving method according to the present application.

An embodiment of the present application further provides an information receiving method, and FIG. 3 is a schematic flowchart of an information receiving method according to the present application. The information receiving method may be suitable for the situation of increasing the transmission efficiency in the scenario where a plurality of communication nodes perform joint transmission with one terminal. The method may be implemented by an information receiving apparatus, which may be implemented by software and/or hardware and integrated in the terminal, provided in the present application.

As shown in FIG. 3, the information receiving method provided by the present application includes steps S310 to S320.

At S310, determining a resource required for receiving information, and receiving the information on the resource, the resource being a resource instructed by a signaling from a first communication node and/or a second communication node, or being a predefined resource.

The first communication node and the second communication node are communication nodes in communication with the terminal. In the case where the terminal receives information from the second communication node, the means by which the second communication node instructs the terminal may be referred to the means by which the first communication node instructs the terminal as described above.

At S320, determining a scheme required for receiving information, and receiving information according to the scheme.

The scheme required for receiving information is a scheme instructed by a signaling from the first communication node and/or the second communication node or a predefined scheme.

In an implementation, the terminal is a third communication node.

In an implementation, the terminal determines the resource required for receiving information, and receives the information on the resource. The terminal determines the scheme required for receiving information, and receives the information according to the scheme. The resource is a resource instructed by a signaling from the first communication node and/or the second communication node, or a predefined resource; and the scheme is a scheme instructed by a signaling from the first communication node and/or the second communication node, or a predefined scheme.

It should be noted that the execution sequence of S310 and S320 is not limited, and in an implementation, S310 is performed before S320. In an implementation, S320 is performed before S310. In an implementation, only S310 is performed. In an implementation, only S320 is performed.

In addition, the flow or method of the UE receiving downlink data in the embodiment is also applicable to the UE sending uplink data to TRP. That is, the technical means by which the terminal determines the resource or scheme required for receiving information is also applicable to determining the resource or scheme required for sending information by the terminal.

Exemplarily, there are two resource assignment schemes for schemes 2*a*/2*b*, i.e., a continuous resource assignment scheme and a discrete resource assignment scheme, respectively. The following is discussed in two cases.

(1) One resource assignment scheme is fixedly adopted.

Assuming that the serving cell of UE1 is TRP1, and there is an ideal backhaul connection between TRP2 and TRP1. TRP1 schedules UE1 via downlink control information, and instructs a frequency domain location A at which UE1 receives downlink data from TRP1 in slot n, instructs a frequency domain location B at which UE1 receives downlink data from TRP2 in slot n, or predefines a frequency domain location B at which UE1 receives downlink data from TRP2 in slot n, where the frequency domain location A and the frequency domain location B do not overlap in the frequency domain. It can be predefined then that at the next slot n+1, UE1 receives the downlink data from TRP1 at the frequency domain location B, and receives the downlink data from TRP2 at the frequency domain location A. That is, the frequency domain locations at which UE1 receives information from TRP1 and TRP2 are alternately changed with changes of the slot in the time domain.

When at least two communication nodes are in communication with the terminal, the terminal may exchange the frequency domain locations corresponding to the respective communication nodes so that the frequency domain locations corresponding to the communication nodes in the current slot are different from those of the previous slot.

Exemplarily, the continuous resource assignment scheme is fixedly adopted, and in order to increase the robustness of transmission, the assigned locations of the resources may be alternately changed with time. For example, in slot n, the frequency domain location of TRP1 on Layer0 is the frequency domain resource of the upper half bandwidth; and the frequency domain location of TRP2 on Layer1 is the frequency domain resource of the lower half bandwidth; in slot n+1, the frequency domain location of TRP1 on Layer0 is the frequency domain resource of the lower half bandwidth; and the frequency domain location of TRP2 on Layer1 is the frequency domain resource of the upper half bandwidth.

(2) Two resource assignment schemes are adopted.

Assuming that a standard adopts both the continuous resource assignment scheme and the discrete resource assignment scheme, such two schemes may be switched by RRC configuration, or by DCI dynamic switching (associated with a certain dynamic parameter), or by changing with time. For example, in slot n, the continuous resource assignment scheme is adopted; and in slot n+1, the discrete resource assignment scheme is adopted.

The granularity for changes of the resource assignment schemes in the time domain may be divided according to odd/even slots, or according to slot sets.

It should be noted that, for the content of the information receiving method that has not been detailed yet, reference may be made to the information sending method, which is not repeated here.

In an implementation, the resource includes at least one of: a frequency domain resource and a time domain resource.

Exemplarily, for a uRLLC transmission solution, in order to distinguish between SDM and FDM, a rule may be predefined between the TRP and the UE, and if the number of TCIs corresponding to a TCI state indicated by a TCI field in DCI is greater than 1, or the number of QCL RS sets included in the TCIs corresponding to the TCI state is greater than 1, it indicates that a plurality of TRPs perform transmission with one UE. Then, the transmission solution is determined according to the following conditions: (1) if DCI indicates a discrete resource assignment scheme, for example, indicates that the UE occupies RB0, RB2, RB4, . . . , RBN-1, then the UE may deduce that the transmission solution is FDM, and that the frequency domain resources occupied by another TRP are RB1, RB3, RB5, . . . , RBN; and (2) if DCI indicates that the resources occupied by the UE are assigned in another manner, the UE may deduce that the transmission solution is SDM.

In an implementation, the assignment scheme of the frequency domain resources at least includes one of the following schemes: continuous frequency domain resource assignment and discrete frequency domain resource assignment.

In an implementation, the scheme for receiving information includes at least one of: a space division scheme, a frequency division scheme, an intra-slot time division scheme, and an inter-slot time division scheme.

In an implementation, the determining the resource required for receiving information includes:

determining, when the scheme for receiving information is a frequency division scheme and the number of TCIs corresponding to the TCI state indicated by the TCI field in downlink control information is greater than 1, that the resource is a frequency domain resource and includes at least one of a first frequency domain resource and a second frequency domain resource;

determining, when the scheme for receiving information is a frequency division scheme and the number of QCL RS sets corresponding to the TCI state indicated by the TCI field in downlink control information is greater than 1, that the resource is a frequency domain resource and includes at least one of a first frequency domain resource and a second frequency domain resource;

determining, when the scheme for receiving information is a time division scheme and the number of TCIs corresponding to the TCI state indicated by the TCI field in downlink control information is greater than 1, that the resource is a frequency domain resource and includes at least one of a first frequency domain resource and a second frequency domain resource;

determining, when the scheme for receiving information is a time division scheme and the number of QCL RS sets corresponding to the TCI state indicated by the TCI field in downlink control information is greater than 1, that the resource is a frequency domain resource and includes at least one of a first frequency domain resource and a second frequency domain resource.

Exemplarily, for the FDM transmission solution in uRLLC, assuming that the serving cell of UE1 is TRP1, and there is an ideal backhaul connection between TRP2 and TRP1. TRP1 schedules UE1 via downlink control information, and instructs a frequency domain location A at which UE1 receives downlink data from TRP1 in slot n. Then, the first communication node may predefine a frequency domain location B at which UE1 receives downlink data from TRP2 at the slot n, where B=A+frequency domain offset value, or B=A−frequency domain offset value, and A and B do not overlap in the frequency domain.

Alternatively, TRP1 schedules UE1 via downlink control information, and instructs a frequency domain location A at which UE1 sends uplink data to TRP1 in slot n. Then, the first communication node may predefine a frequency domain location B at which UE1 sends uplink data to TRP2 in slot n, where B=A+frequency domain offset value, or B=A−frequency domain offset value, and A and B do not overlap in the frequency domain.

When a plurality of second communication nodes are provided, the frequency domain location of each second communication node is determined according to the frequency domain location of the first communication node and a frequency domain offset value corresponding to said each second communication node.

In an implementation, the information receiving method further includes:

determining an assigned location of the second frequency domain resource according to a difference value or sum value of an assigned location of the first frequency domain resource and a location offset value.

In an implementation, the first frequency domain resource and the second frequency domain resource are determined by at least one of:

determining through downlink control information and determining by predefining.

In an implementation, the first frequency domain resource and the second frequency domain resource are determined by:

exchanging, under the condition that the frequency domain resource for the first communication node receiving the information is the first frequency domain resource and the frequency domain resource for the second communication node receiving the information is the second frequency domain resource in a current slot or a slot in a slot set of the current slot the frequency domain resources of the first communication node and the second communication node in a next slot or a next slot in the slot set of the current slot.

In an implementation, the determining the scheme required for receiving information includes:

determining, under the condition that the assigned location of the frequency domain resource instructed by the signaling satisfies a preset rule, that the scheme for receiving information is a frequency division scheme.

In an implementation, the preset rule includes at least one of:

the numbered assigned location of the frequency domain resource is an odd RB, an odd RBG, an odd PRG, an even RB, an even RBG or an even PRG.

In an implementation, the information receiving method further includes: scrambling the received information with a scrambling sequence generated by a scrambling sequence generator with initialization values determined by a determining scheme including at least one of: $c_{init}=n_{RNTI}\cdot 2^{15}+q\cdot 2^{14}+g\cdot 2^{o}n_{ID}$, where x is 10, 11, 12 or 13; $g\in\{0, 1\}$ and is associated with a CORESET group ID; $q\in\{0,1\}$ and is associated with the number of the transmitted codewords; $n_{RNTI}$ is a radio network temporary identity; and $n_{ID}\in\{0,1, \ldots ,1023\}$ or is a cell ID.

In an implementation, the information receiving method further includes: scrambling the received information using a scrambling sequence generated by a scrambling sequence generator with initialization values determined by a determining scheme including at least one of: $c_{init}=n_{RNTI}\cdot 2^{15}+q\cdot 2^{14}+n_{ID}$, where $n_{ID}\in\{0,1, \ldots , 1023\}$ or is a cell ID; where under the condition that at least two CORESET groups are configured in a higher-layer signaling, the value of q is associated with the CORESET group ID.

In an implementation, the value of q includes at least one of:

under the condition that the CORESET group ID is 0, the value of q corresponding to codeword 0 is 0, and the value of q corresponding to codeword 1 is 1;

under the condition that the CORESET group ID is 0, the value of q corresponding to codeword 0 is 1, and the value of q corresponding to codeword 1 is 0;

under the condition that the CORESET group ID is 1, the value of q corresponding to codeword 0 is 1, and the value of q corresponding to codeword 1 is 0; and under the condition that the CORESET group ID is 1, the value of q corresponding to codeword 0 is 0, and the value of q corresponding to codeword 1 is 1.

In an implementation, the scheme for determining includes at least one of: configuring at least two $n_{ID}$, which respectively correspond to at least two CORESET group IDs, through a higher-layer signaling.

The corresponding technical means by which the terminal uses the scrambling sequence to scramble the received information may refer to the technical means by which the first communication node uses the scrambling sequence to scramble the sent information, which is not repeated here.

In an implementation, under the condition that the scheme for receiving information is a time division scheme, the time domain resource includes a first time domain resource and a second time domain resource.

In an implementation, the information receiving method further includes:

determining a time domain symbol location of the second time domain resource according to a start symbol and a symbol length of the first time domain resource.

Exemplarily, for the TDM transmission solution in uRLLC, assuming that the serving cell of UE1 is TRP1, and there is an ideal backhaul connection between TRP2 and TRP1. TRP1 schedules UE1 via downlink control information, and instructs that UE1 receives downlink data from TRP1 in slot n. If the time domain resource assignment field in DCI indicates a symbol length M, and a start symbol K, it means that UE1 receives the downlink data from TRP1 at a time domain symbol location from symbol K to symbol K+M−1. When (14−K−M) is greater than or equal to M (i.e., 2M<=14−K), UE1 receives downlink data from TRP2 at M symbols from symbol location K+M to 13 in slot n.

An embodiment of the present application provides an information sending apparatus, and the information sending apparatus in the embodiment of the present application may be integrated in the first communication node. The apparatus includes: at least one processor configured to: determine a resource required for sending information, and instruct, by means of signaling, the terminal to receive information on the resource, or predefine the resource on which a terminal receives information; and determine a scheme required for sending information, and instruct the terminal, by means of signaling, about the scheme for sending information, or predefine the scheme for sending information.

The information sending apparatus provided in the embodiment is used for implementing the information sending method described above, and the implementation principle and technical effect of the information sending apparatus provided in the embodiment are similar to those of the information sending method described above, and thus are not repeated here.

In an implementation, the at least one processor is configured such that the resource includes at least one of: a frequency domain resource and a time domain resource.

In an implementation, the at least one processor is configured such that the assignment scheme of frequency domain resources includes at least one of: continuous frequency domain resource assignment and discrete frequency domain resource assignment.

In an implementation, the at least one processor is configured such that the scheme for sending information includes at least one of: a space division scheme, a frequency division scheme, an intra-slot time division scheme, and an inter-slot time division scheme.

In an implementation, the at least one processor is configured to determine the resource required for sending information by at least one of: determining, when the scheme for sending information is a frequency division scheme and the number of TCIs corresponding to a TCI state indicated by a TCI field in downlink control information is greater than 1, that the resource is a frequency domain resource and includes at least one of a first frequency domain resource and a second frequency domain resource; determining, when the scheme for sending information is a frequency division scheme and the number of QCL RS sets corresponding to the TCI state indicated by the TCI field in downlink control information is greater than 1, that the resource is a frequency domain resource and includes at least one of a first frequency domain resource and a second frequency domain resource; determining, when the scheme for sending information is a time division scheme and the number of TCIs corresponding to the TCI state indicated by the TCI field in downlink control information is greater than 1, that the resource is a frequency domain resource and includes at least one of a first frequency domain resource and a second frequency domain resource; and determining, when the scheme for sending information is a time division scheme and the number of QCL RS sets corresponding to the TCI state indicated by the TCI field in downlink control information is greater than 1, that the resource is a frequency domain resource and includes at least one of a first frequency domain resource and a second frequency domain resource.

In an implementation, the at least one processor is further configured to: determine an assigned location of the second frequency domain resource according to a difference value or sum value of an assigned location of the first frequency domain resource and a location offset value.

In an implementation, the at least one processor is configured such that the first frequency domain resource and the second frequency domain resource are determined by at least one of: determining through downlink control information and determining by predefining.

In an implementation, the at least one processor is configured such that the first frequency domain resource and the second frequency domain resource are determined by: exchanging, under the condition that the frequency domain resource for the first communication node sending the information is the first frequency domain resource and the frequency domain resource for the second communication node sending the information is the second frequency domain resource in a current slot or a slot in a slot set of the current slot, the frequency domain resources of the first communication node and the second communication node in a next slot or a next slot in the slot set of the current slot.

In an implementation, the at least one processor is configured to determine the scheme required for sending information by: determining, under the condition that the assigned location of the frequency domain resource instructed by the signaling satisfies a preset rule, that the scheme for sending information is a frequency division scheme.

In an implementation, the at least one processor is configured such that the preset rule includes at least one of: the numbered assigned location of the frequency domain resource is an odd RB, an odd RBG, an odd PRG, an even RB, an even RBG or an even PRG.

In an implementation, the at least one processor is further configured to: scramble the sent information using a scrambling sequence generated by a scrambling sequence generator with initialization values determined by a determining scheme including at least one of: $c_{init}=n_{RNTI}\cdot 2^{15}+q\cdot 2^{14}+g\cdot 2^{x}+n_{ID}$, where x is 10, 11, 12 or 13; $g\in\{0,1\}$ and is associated with a CORESET group ID; $q\in\{0,1\}$ and is associated with the number of the transmitted codewords; $n_{RNTI}$ is a radio network temporary identity; and $n_{ID}\in\{0,1, \ldots ,1023\}$ or is a cell ID.

In an implementation, the at least one processor is further configured to: scramble the sent information using a scrambling sequence generated by a scrambling sequence generator with initialization values determined by a determining scheme including at least one of: $c_{init}=n_{RNTI}\cdot 2^{15}+q\cdot 2^{14}+n_{ID}$, wherein $n_{ID}\in\{0, 1, \ldots , 1023\}$ or is a cell ID; where under the condition that at least two CORESET groups are configured in a higher-layer signaling, the value of q is associated with the CORESET group ID.

In an implementation, the at least one processor is configured such that the value of q includes at least one of: under the condition that the CORESET group ID is 0, the value of q corresponding to codeword 0 is 0, and the value of q corresponding to codeword 1 is 1; under the condition that the CORESET group ID is 0, the value of q corresponding to codeword 0 is 1, and the value of q corresponding to codeword 1 is 0; under the condition that the CORESET group ID is 1, the value of q corresponding to codeword 0 is 1, and the value of q corresponding to codeword 1 is 0; and under the condition that the CORESET group ID is 1, the value of q corresponding to codeword 0 is 0, and the value of q corresponding to codeword 1 is 1.

In an implementation, the at least one processor is configured such that the scheme for determining $n_{ID}$ includes at least one of: configuring at least two $n_{ID}$, which respectively correspond to at least two CORESET group IDs, to the terminal through a higher-layer signaling.

In an implementation, the at least one processor is configured such that under the condition that the scheme for sending information is a time division scheme, the time domain resource includes a first time domain resource and a second time domain resource.

In an implementation, the at least one processor is further configured to: determine a time domain symbol location of the second time domain resource according to a start symbol and a symbol length of the first time domain resource.

An embodiment of the present application provides an information receiving apparatus, including: at least one processor configured to determine a resource required for receiving information, and receive the information on the resource; and determine a scheme required for receiving information, and receive information according to the scheme, the resource is a resource instructed by a signaling from a first communication node and/or a second communication node, or a predefined resource.

The information receiving apparatus provided in the embodiment is used for implementing the information receiving method described above, and the implementation principle and technical effect of the information receiving apparatus provided in the embodiment are similar to those of the information receiving method described above, and thus are not repeated here.

In an implementation, the at least one processor is configured such that the resource includes at least one of: a frequency domain resource and a time domain resource.

In an implementation, the at least one processor is configured such that the assignment scheme of the frequency domain resources includes at least one of: continuous frequency domain resource assignment and discrete frequency domain resource assignment.

In an implementation, the at least one processor is configured such that the scheme for receiving information includes at least one of: a space division scheme, a frequency division scheme, an intra-slot time division scheme, and an inter-slot time division scheme.

In an implementation, the at least one processor is configured to determine the resource required for receiving information by: determining, when the scheme for receiving information is a frequency division scheme and the number of TCIs corresponding to a TCI state indicated by a TCI field in downlink control information is greater than 1, that the resource is a frequency domain resource and includes at least one of a first frequency domain resource and a second frequency domain resource; determining, when the scheme for receiving information is a frequency division scheme and the number of QCL RS sets corresponding to the TCI state indicated by the TCI field in downlink control information is greater than 1, that the resource is a frequency domain resource and includes at least one of a first frequency domain resource and a second frequency domain resource; determining, when the scheme for receiving information is a time division scheme and the number of TCIs corresponding to the TCI state indicated by the TCI field in downlink control information is greater than 1, that the resource is a frequency domain resource and includes at least one of a first frequency domain resource and a second frequency domain resource; determining, when the scheme for receiving information is a time division scheme and the number of QCL RS sets corresponding to the TCI state indicated by the TCI field in downlink control information is greater than 1, that the resource is a frequency domain resource and includes at least one of a first frequency domain resource and a second frequency domain resource.

In an implementation, the at least one processor is further configured to: determine an assigned location of the second frequency domain resource according to a difference value or sum value of an assigned location of the first frequency domain resource and a location offset value.

In an implementation, the at least one processor is configured such that the first frequency domain resource and the second frequency domain resource are determined by at least one of: determining through downlink control information and determining by predefining.

In an implementation, the at least one processor is configured such that the first frequency domain resource and the second frequency domain resource are determined by: exchanging, under the condition that the frequency domain resource for the first communication node receiving the information is the first frequency domain resource and the frequency domain resource for the second communication node receiving the information is the second frequency domain resource in a current slot or a slot in a slot set of the current slot, the frequency domain resources of the first communication node and the second communication node in a next slot or a next slot in the slot set of the current slot.

In an implementation, the at least one processor is configured to determine the scheme required for receiving information by: determining, under the condition that the assigned location of the frequency domain resource instructed by the signaling satisfies a preset rule, that the scheme for receiving information is a frequency division scheme.

In an implementation, the at least one processor is configured such that the preset rule includes at least one of: the numbered assigned location of the frequency domain resource is an odd RB, an odd RBG, an odd PRG, an even RB, an even RBG or an even PRG.

In an implementation, the at least one processor is further configured to: scramble the received information using a scrambling sequence generated by a scrambling sequence generator with initialization values determined by a determining scheme including at least one of: $c_{init}=n_{RNTI}\cdot 2^{15}+q\cdot 2^{14}+g\cdot 2^{x}+n_{ID}$, where x is 10, 11, 12 or 13; $g\in\{0,1\}$ and is associated with a CORESET group ID; $q\in\{0,1\}$ and is associated with the number of the transmitted codewords; $n_{RNTI}$ is a radio network temporary identity; and $n_{ID}\in\{0,1, \ldots ,1023\}$ or is a cell ID.

In an implementation, the at least one processor is further configured to: scramble the received information using a scrambling sequence generated by a scrambling sequence generator with initialization values determined by a determining scheme including at least one of: $c_{init}=n_{RNTI}\cdot 2^{15}+q\cdot 2^{14}+n_{ID}$, where $n_{ID}\in\{0,1, \ldots , 1023\}$ or is a cell ID; where under the condition that at least two CORESET groups are configured in a higher-layer signaling, the value of q is associated with the CORESET group ID.

In an implementation, the at least one processor is configured such that the value of q includes at least one of: under the condition that the CORESET group ID is 0, the value of q corresponding to codeword 0 is 0, and the value of q corresponding to codeword 1 is 1; under the condition that the CORESET group ID is 0, the value of q corresponding to codeword 0 is 1, and the value of q corresponding to codeword 1 is 0; under the condition that the CORESET group ID is 1, the value of q corresponding to codeword 0 is 1, and the value of q corresponding to codeword 1 is 0; and under the condition that the CORESET group ID is 1, the value of q corresponding to codeword 0 is 0, and the value of q corresponding to codeword 1 is 1.

In an implementation, the at least one processor is configured such that the scheme for determining $n_{ID}$ includes at least one of: configuring at least two $n_{ID}$, which respectively correspond to at least two CORESET group IDs, through a higher-layer signaling.

In an implementation, the at least one processor is configured such that under the condition that the scheme for receiving information is a time division scheme, the time domain resource includes a first time domain resource and a second time domain resource.

In an implementation, the at least one processor is further configured to: determine a time domain symbol location of the second time domain resource according to a start symbol and a symbol length of the first time domain resource.

Figure 4:
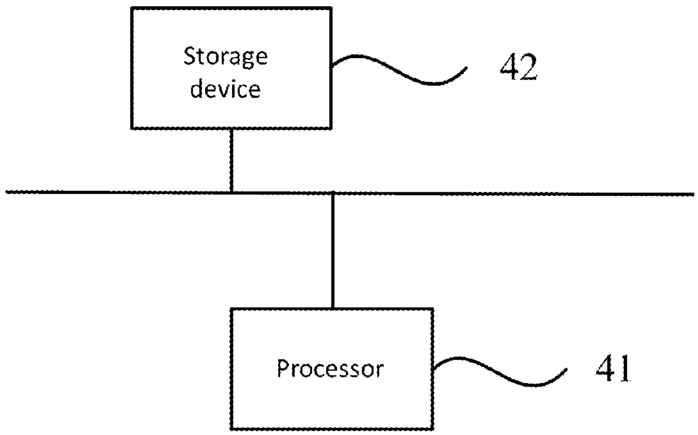
FIG. 4 is a schematic structural diagram of a first communication node according to the present application.

An embodiment of the present application further provides a first communication node. FIG. 4 is a schematic structural diagram of a first communication node provided in the present application. As shown in FIG. 4, the first communication node provided by the present application includes one or more processors 41 and a storage device 42. One or more processors 41 may be provided in the first communication node, and FIG. 4 illustrates one processor 41 as an example. The storage device 42 is configured to store one or more programs to be executed by the one or more processors 41, so that the one or more processors 41 implement the information sending method as described in the embodiment of the present application.

The processors 41 and the storage device 42 in the first communication node may be connected by a bus or other means, and FIG. 4 illustrates the connection by a bus as an example.

The storage device 42, as a computer-readable storage medium, may be configured to store software programs, computer-executable programs, and modules, such as program instructions/modules (e.g., the at least one processor in the information sending apparatus) corresponding to the information sending method according to the embodiment of the present application. The storage device 42 may include a program storage area and a data storage area. The program storage area may store an operating system, or application programs required for at least one function; and the data storage area may store data created according to the use of the first communication node, and the like. Further, the storage device 42 may include a high speed random access memory, and may further include a non-volatile memory, such as at least one magnetic disk memory device, flash memory device, or other non-volatile solid state memory devices. In some examples, the storage device 42 may further include a memory remotely disposed relative to the processor 41, which may be connected to the first communication node via a network. Examples of such network include, but are not limited to, the Internet, intranets, local area networks, mobile communication networks, and combinations thereof.

Figure 5:
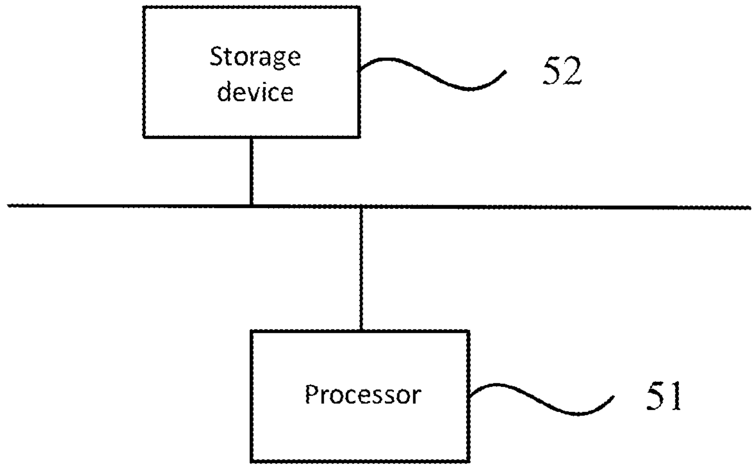
FIG. 5 is a schematic structural diagram of a terminal according to the present application.

An embodiment of the present application further provides a terminal, and FIG. 5 is a schematic structural diagram of a terminal provided in the present application. As shown in FIG. 5, the terminal provided by the present application includes one or more processors 51 and a storage device 52. One or more processors 51 may be provided in the terminal, and FIG. 5 illustrates one processor 51 as an example. The storage device 52 is configured to store one or more programs to be executed by the one or more processors 51, so that the one or more processors 51 implement the information receiving method as described in the embodiment of the present application.

The processors 51 and the storage device 52 in the terminal may be connected by a bus or other means, and FIG. 5 illustrates the connection by a bus as an example.

The storage device 52, as a computer-readable storage medium, may be configured to store software programs, computer-executable programs, and modules, such as program instructions/modules (e.g., the at least one processor in the information receiving apparatus) corresponding to the information receiving method according to the embodiment of the present application. The storage device 52 may include a program storage area and a data storage area. The program storage area may store an operating system, or an application program required for at least one function; and the data storage area may store data created according to the use of the terminal, and the like. Further, the storage device 52 may include a high speed random access memory, and may further include a non-volatile memory, such as at least one magnetic disk memory device, flash memory device, or other non-volatile solid state memory devices. In some examples, the storage device 52 may further include a memory remotely disposed relative to the processor 51, which may be connected to the terminal via a network. Examples of such network include, but are not limited to, the Internet, intranets, local area networks, mobile communication networks, and combinations thereof.

An embodiment of the present application further provides a storage medium having a computer program stored thereon which, when executed by a processor, causes the method for receiving information or the method for sending information of the embodiments of the present application to be implemented. The information sending method includes: determining a resource required for sending information, and instructing, by means of signaling, a terminal to receive information on the resource, or predefining the resource on which the terminal receives information; and determining a scheme required for sending information, and instructing the terminal, by means of signaling, about the scheme for sending information, or predefining the scheme for sending information.

The information receiving method includes: determining a resource required for receiving information, and receiving the information on the resource, the resource being a resource instructed by a signaling from a first communication node and/or a second communication node, or being a predefined resource; and determining a scheme required for receiving information, and receiving information according to the scheme, the scheme being a scheme instructed by a signaling from a first communication node and/or a second communication node, or being a predefined scheme.

The above embodiments are only exemplary embodiments of the present application and not intended to limit the scope of the present application.

It will be clear to a person skilled in the art that the term "terminal" covers any suitable type of wireless user equipment, such as a mobile phone, a portable data processing device, a portable web browser or a vehicle mobile station.

In general, the various embodiments of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, Instruction Set Architecture (ISA) instructions, machine instructions, machine-related instructions, microcode, firmware instructions, state setting data, or source code or object code written in any combination of one or more programming languages.

The block diagram of any logic flow in any figure of the present application may represent program steps, or may represent interconnected logic circuits, modules, and functions, or may represent a combination of program steps and logic circuits, modules, and functions. The computer program may be stored on a memory. The memory may be of any type suitable to the local technical environment and may be implemented using any suitable data storage technology, such as but not limited to, read-only memories (ROMs), Random Access Memories (RAMs), optical storage devices and systems (Digital Video disks (DVDs), Compact Discs (CDs)), etc. The computer-readable medium may include a non-transitory storage medium. The data processor may be of any type suitable to the local technical environment, such as but not limited to, general purpose computers, dedicated computers, microprocessors, Digital Signal Processors (DSPs), Application Specific Integrated Circuits (ASICs), Field-Programmable Gate Arrays (FGPAs), and processors based on a multi-core processor architecture.

What is claimed is:

1. An information sending method applied to a first communication node, comprising:

determining a resource for sending information, and instructing, by means of a first signaling, a terminal to receive the information on the resource;

determining a scheme for sending the information, and instructing the terminal, by means of a second signaling, about the scheme for sending the information; and determining, in response to that the scheme for sending the information is a time division scheme and a number of quasi-co-location reference signal (QCL RS) sets indicated by a TCI field in downlink control information (DCI) is greater than 1, that the resource is a time domain resource and comprises a first time domain resource and a second time domain resource, the first time domain resource and the second time domain resource correspond to different QCL RS sets from the QCL RS sets indicated by the TCI field, wherein the first time domain resource and the second time domain resource are in one same time slot, a time domain symbol location of the second time domain resource is determined according to a start time domain symbol and a number of time domain symbols of the first time domain resource, the second time domain resource is after the first time domain resource, the first time domain resource and the second time domain resource do not overlap each other, the number of time domain symbols of the first time domain resource equals to a number of time domain symbols of the second time domain resource, the first time domain resource comprises M time domain symbols at locations from K to K+M−1 in the one same time slot and the second time domain resource comprises M time domain symbols at locations from K+M to K+2M−1 in the one same time slot, wherein M and K are positive integers and dynamically indicated by the downlink control information (DCI), the method further comprises:

scrambling the sent information using a scrambling sequence generated by a scrambling sequence generator with initialization values determined by a determining scheme comprising:

$$c_{init}=n_{RNTI}\cdot 2^{15}+q\cdot 2^{14}+n_{ID},$$

$n_{RNTI}$ is a radio network temporary identity, $q\in\{0,1\}$ and is associated with a number of transmitted codewords, $n_{ID}\in\{0,1, \ldots, 1023\}$ or is a cell ID, in response to that at least two control resource set (CORESET) groups are configured in a higher-layer signaling, a value of q is associated with a CORESET group ID, and at least two $n_{ID}$ respectively corresponding to at least two CORESET group IDs are configured to the terminal through the higher-layer signaling.

2. The method according to claim 1, wherein the determining a resource for sending information comprises:

determining, in response to that the scheme for sending the information is a frequency division scheme and the number of QCL RS sets indicated by the TCI field in the downlink control information is greater than 1, that the resource is a frequency domain resource and comprises at least one of a first frequency domain resource and a second frequency domain resource;

determining an assigned location of the second frequency domain resource according to a difference value or sum value of an assigned location of the first frequency domain resource and a location offset value.

3. The method according to claim 2, wherein the first frequency domain resource and the second frequency domain resource are determined by:

exchanging, in response to that a frequency domain resource for the first communication node sending the information is the first frequency domain resource and a frequency domain resource for a second communication node sending the information is the second frequency domain resource in a current slot or a slot in a current slot set, the frequency domain resource of the first communication node and the frequency domain resource of the second communication node, with each other in a next slot of the current slot or a slot in a slot set next to the current slot set.

4. An information receiving method, comprising:

determining a resource for receiving information, and receiving the information on the resource, the resource being a resource instructed by a first signaling from at least one of a first communication node and a second communication node; and determining a scheme for receiving the information, and receiving the information according to the scheme, the scheme being a scheme instructed by a second signaling from the at least one of the first communication node and the second communication node, determining, in response to that the scheme for receiving the information is a time division scheme and a number of quasi-co-location reference signal (QCL RS) sets indicated by a TCI field in downlink control information (DCI) is greater than 1, that the resource is a time domain resource and comprises a first time domain resource and a second time domain resource, the first time domain resource and the second time domain resource correspond to different QCL RS sets from the QCL RS sets indicated by the TCI field, wherein the first time domain resource and the second time domain resource are in one same time slot, a time domain symbol location of the second time domain resource is determined according to a start time domain symbol and a number of time domain symbols of the first time domain resource, the second time domain resource is after the first time domain resource, the first time domain resource and the second time domain resource do not overlap each other, the number of time domain symbols of the first time domain resource equals to a number of time domain symbols of the second time domain resource, the first time domain resource comprises M time domain symbols at locations from K to K+M−1 in the one same time slot and the second time domain resource comprises M time domain symbols at locations from K+M to K+2M−1 in the one same time slot, wherein M and K are positive integers and dynamically indicated by the downlink control information (DCI), the method further comprises:

descrambling the received information using a scrambling sequence generated by a scrambling sequence generator with initialization values determined by a determining scheme comprising:

$$c_{init}=n_{RNTI}\cdot 2^{15}+q\cdot 2^{14}+n_{ID},$$

$n_{RNTI}$ is a radio network temporary identity, $q\in\{0,1\}$ and is associated with a number of transmitted codewords, $n_{ID}\in\{0,1, \ldots, 1023\}$ or is a cell ID, in response to that at least two control resource set (CORESET) groups are configured in a higher-layer signaling, a value of q is associated with a CORESET group ID, and at least two $n_{ID}$ respectively corresponding to at least two CORESET group IDs are configured to the terminal through the higher-layer signaling.

5. The method according to claim 4, wherein the determining a resource for receiving information comprises:

determining, in response to that the scheme for receiving the information is a frequency division scheme and the number of quasi co-location reference signal (QCL RS) sets indicated by the TCI field in the downlink control information is greater than 1, that the resource is a frequency domain resource and comprises at least one of a first frequency domain resource and a second frequency domain resource;

determining an assigned location of the second frequency domain resource according to a difference value or sum value of an assigned location of the first frequency domain resource and a location offset value.

6. The method according to claim 5, wherein the first frequency domain resource and the second frequency domain resource are determined by:

exchanging, in response to that a frequency domain resource for the first communication node receiving the information is the first frequency domain resource and a frequency domain resource for the second communication node receiving the information is the second frequency domain resource in a current slot or a slot in a current slot set, the frequency domain resource of the first communication node and the frequency domain resource of the second communication node, with each other in a next slot of the current slot or a slot in a slot set next to the current slot set.

7. An information sending apparatus, comprising at least one processor configured to:

determine a resource for sending information, and instruct, by means of a first signaling, a terminal to receive the information on the resource;

determine a scheme for sending the information, and instruct the terminal, by means of a second signaling, about the scheme for sending the information; and determine, in response to that the scheme for sending the information is a time division scheme and a number of quasi-co-location reference signal (QCL RS) sets indicated by a TCI field in downlink control information (DCI) is greater than 1, that the resource is a time domain resource and comprises a first time domain resource and a second time domain resource, the first time domain resource and the second time domain resource correspond to different QCL RS sets from the QCL RS sets indicated by the TCI field, wherein the first time domain resource and the second time domain resource are in one same time slot, a time domain symbol location of the second time domain resource is determined according to a start time domain symbol and a number of time domain symbols of the first time domain resource, the second time domain resource is after the first time domain resource, the first time domain resource and the second time domain resource do not overlap each other, the number of time domain symbols of the first time domain resource equals to a number of time domain symbols of the second time domain resource, the first time domain resource comprises M time domain symbols at locations from K to K+M−1 in the one same time slot and the second time domain resource comprises M time domain symbols at locations from K+M to K+2M−1 in the one same time slot, wherein M and K are positive integers and dynamically indicated by the downlink control information (DCI), wherein the at least one processor is configured to:

scramble the sent information using a scrambling sequence generated by a scrambling sequence generator with initialization values determined by a determining scheme comprising:

$$c_{init}=n_{RNTI}\cdot 2^{15}+q\cdot 2^{14}+n_{ID},$$

$n_{RNTI}$ is a radio network temporary identity, $q\in\{0,1\}$ and is associated with a number of transmitted codewords, $n_{ID}\in\{0,1, \ldots, 1023\}$ or is a cell ID, in response to that at least two control resource set (CORESET) groups are configured in a higher-layer signaling, a value of q is associated with a CORESET group ID, and at least two $n_{ID}$ respectively corresponding to at least two CORESET group IDs are configured to the terminal through the higher-layer signaling.

8. An information receiving apparatus, comprising at least one processor configured to:

determine a resource for receiving information, and receive the information on the resource;

determine a scheme for receiving the information, and receive the information according to the scheme, wherein the resource is a resource instructed by a first signaling from at least one of a first communication node and a second communication node, and the scheme is a scheme instructed by a second signaling from the at least one of the first communication node and the second communication node; and determine, in response to that the scheme for receiving the information is a time division scheme and a number of quasi-co-location reference signal (QCL RS) sets indicated by a TCI field in downlink control information (DCI) is greater than 1, that the resource is a time domain resource and comprises a first time domain resource and a second time domain resource, the first time domain resource and the second time domain resource correspond to different QCL RS sets from the QCL RS sets indicated by the TCI field, wherein the first time domain resource and the second time domain resource are in one same time slot, a time domain symbol location of the second time domain resource is determined according to a start time domain symbol and a number of time domain symbols of the first time domain resource, the second time domain resource is after the first time domain resource, the first time domain resource and the second time domain resource does not overlap each other, the number of time domain symbols of the first time domain resource equals to a number of time domain symbols of the second time domain resource, the first time domain resource comprises M time domain symbols at locations from K to K+M−1 in the one same time slot and the second time domain resource comprises M time domain symbols at locations from K+M to K+2M−1 in the one same time slot, wherein M and K are positive integers and dynamically indicated by the downlink control information (DCI), wherein the at least one processor is configured to:

descramble the received information using a scrambling sequence generated by a scrambling sequence generator with initialization values determined by a determining scheme comprising:

$$c_{init}=n_{RNTI}\cdot 2^{15}+q\cdot 2^{14}+n_{ID},$$

$n_{RNTI}$ is a radio network temporary identity, $q\in\{0,1\}$ and is associated with a number of transmitted codewords, $n_{ID}\in\{0,1, \ldots, 1023\}$ or is a cell ID, in response to that at least two control resource set (CORESET) groups are configured in a higher-layer signaling, a value of q is associated with a CORESET group ID, and at least two $n_{ID}$ respectively corresponding to at least two CORESET group IDs are configured to the terminal through the higher-layer signaling.

9. The information sending apparatus according to claim 7, wherein the at least one processor is configured to determine the resource for sending the information by:

determining, in response to that the scheme for sending the information is a frequency division scheme and the number of QCL RS sets indicated by the TCI field in the downlink control information is greater than 1, that the resource is a frequency domain resource and comprises at least one of a first frequency domain resource and a second frequency domain resource, wherein the at least one processor is further configured to: determine an assigned location of the second frequency domain resource according to a difference value or sum value of an assigned location of the first frequency domain resource and a location offset value.

10. The information receiving apparatus according to claim 8, wherein the at least one processor is configured to determine the resource for receiving the information by:

determining, in response to that the scheme for receiving the information is a frequency division scheme and the number of quasi co-location reference signal (QCL RS) sets indicated by the TCI field in the downlink control information is greater than 1, that the resource is a frequency domain resource and comprises at least one of a first frequency domain resource and a second frequency domain resource, wherein the at least one processor is further configured to: determine an assigned location of the second frequency domain resource according to a difference value or sum value of an assigned location of the first frequency domain resource and a location offset value.

11. The method according to claim 1, wherein the value of q comprises at least one of following:

in response to that the CORESET group ID is 0, the value of q corresponding to codeword 0 is 0, and the value of q corresponding to codeword 1 is 1;

in response to that the CORESET group ID is 0, the value of q corresponding to codeword 0 is 1, and the value of q corresponding to codeword 1 is 0;

in response to that the CORESET group ID is 1, the value of q corresponding to codeword 0 is 1, and the value of q corresponding to codeword 1 is 0; and in response to that the CORESET group ID is 1, the value of q corresponding to codeword 0 is 0, and the value of q corresponding to codeword 1 is 1.

12. The method according to claim 4, wherein the value of q comprises at least one of:

in response to that the CORESET group ID is 0, the value of q corresponding to codeword 0 is 0, and the value of q corresponding to codeword 1 is 1;

in response to that the CORESET group ID is 0, the value of q corresponding to codeword 0 is 1, and the value of q corresponding to codeword 1 is 0;

in response to that the CORESET group ID is 1, the value of q corresponding to codeword 0 is 1, and the value of q corresponding to codeword 1 is 0; and in response to that the CORESET group ID is 1, the value of q corresponding to codeword 0 is 0, and the value of q corresponding to codeword 1 is 1.

* * * * *